US012656785B2

(12) United States Patent
Miyoshi

(10) Patent No.: US 12,656,785 B2
(45) Date of Patent: Jun. 16, 2026

(54) FLIGHT PATH SPECIFICATION DEVICE AND COMPUTER READABLE STORAGE MEDIUM

(71) Applicant: FANUC CORPORATION, Yamanashi (JP)

(72) Inventor: Takashi Miyoshi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 265 days.

(21) Appl. No.: 18/252,190

(22) PCT Filed: Nov. 16, 2021

(86) PCT No.: PCT/JP2021/042131
§ 371 (c)(1),
(2) Date: May 9, 2023

(87) PCT Pub. No.: WO2022/107774
PCT Pub. Date: May 27, 2022

(65) Prior Publication Data
US 2024/0019874 A1      Jan. 18, 2024

(30) Foreign Application Priority Data

Nov. 20, 2020      (JP) ................................. 2020-193371

(51) Int. Cl.
*G05D 1/617*          (2024.01)
*G05B 19/4061*        (2006.01)
(Continued)

(52) U.S. Cl.
CPC ......... *G05D 1/617* (2024.01); *G05B 19/4061* (2013.01); *G05D 1/101* (2013.01); *G05B 19/4097* (2013.01)

(58) Field of Classification Search
CPC .... G05D 1/617; G05D 1/101; G05B 19/4061; G05B 19/4097; G05B 2219/39135; B25J 9/1682

See application file for complete search history.

(56) References Cited

U.S. PATENT DOCUMENTS 9,738,381 B1 *   8/2017   Loud ..................... G05D 1/0094
2009/0326711 A1 *  12/2009   Chang ................... B25J 9/1666
                                              700/255
(Continued)

FOREIGN PATENT DOCUMENTS

CN          106406341 A          2/2017
CN          106416341 A          2/2017
(Continued)

OTHER PUBLICATIONS

International Search Report in PCT/JP2021/042131, mailed Feb. 8, 2022, 2pp.

(Continued)

*Primary Examiner* — Abby Lin
*Assistant Examiner* — Karston G. Evans
(74) *Attorney, Agent, or Firm* — HAUPTMAN HAM, LLP

(57) ABSTRACT

A flight path specification device includes: a space information generation unit configured to, based on model data on a structure of an industrial machine and an operating state of the industrial machine, generate non-interference space information indicating a non-interference space in which the industrial machine and an unmanned aircraft do not interfere with each other; a command accepting unit configured to accept an operation command for the unmanned aircraft; and a path information generation unit configured to, based on the non-interference space information and the operation (Continued)

FLIGHT PATH SPECIFICATION DEVICE 2

201 MODEL ACQUISITION UNIT

202 MODEL DATA STORAGE UNIT

203 OPERATION STATE ACQUISITION UNIT

204 SPACE INFORMATION GENERATION UNIT

205 COMMAND ACCEPTING UNIT

206 COMMAND INFORMATION STORAGE UNIT

207 PATH INFORMATION GENERATION UNIT

208 PATH INFORMATION OUTPUT UNIT

209 CONTROL INFORMATION GENERATION UNIT

210 CONTROL INFORMATION OUTPUT UNIT command, generate flight path information that specifies a flight path for the unmanned aircraft.

9 Claims, 13 Drawing Sheets

(51) Int. Cl.
  *G05D 1/00*      (2024.01)
  *G05B 19/4097*   (2006.01)

(56)              References Cited

U.S. PATENT DOCUMENTS

| | | | |
|---|---|---|---|
| 2017/0192418 A1* | 7/2017 | Bethke | B64U 10/13 |
| 2017/0329307 A1 | 11/2017 | Castillo-Effen et al. | |
| 2018/0070267 A1 | 3/2018 | Ye | |
| 2019/0217857 A1* | 7/2019 | Sorin | B60W 30/09 |
| 2020/0086489 A1 | 3/2020 | Goto | |
| 2020/0265731 A1* | 8/2020 | Lev | G08G 5/32 |
| 2020/0310384 A1 | 10/2020 | Miyoshi | |
| 2020/0398428 A1* | 12/2020 | Murray | B25J 9/1682 |
| 2021/0060777 A1* | 3/2021 | Dupuis | B25J 9/0084 |
| 2021/0174688 A1* | 6/2021 | Cajias | G08G 5/26 |
| 2022/0254260 A1 | 8/2022 | Feng | |
| 2022/0351627 A1* | 11/2022 | Ali | G08G 5/53 |
| 2023/0074148 A1* | 3/2023 | Di Cairano | G05D 1/104 |
| 2023/0092896 A1* | 3/2023 | Zuckerman | G05D 1/12 |
| | | | 705/338 |

FOREIGN PATENT DOCUMENTS

| | | | |
|---|---|---|---|
| CN | 110750106 A | 2/2020 |
| CN | 111752221 A | 10/2020 |
| JP | 2007-283450 A | 11/2007 |
| JP | 2018-146946 A | 9/2018 |
| JP | 2019026121 A | 2/2019 |
| JP | 2019-179422 A | 10/2019 |
| JP | 2020-046717 A | 3/2020 |
| JP | 2020-119122 A | 8/2020 |
| JP | 2020123121 A | 8/2020 |
| JP | 2020-142326 A | 9/2020 |
| JP | 2020-166352 A | 10/2020 |
| WO | 2010073294 A1 | 7/2010 |
| WO | 2020189491 A1 | 9/2020 |

OTHER PUBLICATIONS

Taua M. Cabreira et al., Surveying on Coverage Path Planning with Unmanned Aerial Vehicles, www.mdpi.com/journal/drones, Drones 2019, 3, 4; doi:10.3390/drones 3010004, Jan. 3, 2019; 38 pp.
Wang Yu et al., Path Planning Method Based on Grid—GSA for Plant Protection UAV, Journal of Agricultural Machinery, Dec. 31, 2017; 26 pp.

* cited by examiner

| OPERATION COMMAND | OPERATION POSITION |
|---|---|
| ⋮ | ⋮ |
| IMAGE CAPTURING OF THERMOMETER | (X1, Y1, Z1) |
| IMAGE CAPTURING OF TOOL EDGE | (X2, Y2, Z2) |
| INSTALLATION OF WORKPIECE | (X3, Y3, Z3) |
| ⋮ | ⋮ |

FLIGHT PATH SPECIFICATION DEVICE AND COMPUTER READABLE STORAGE MEDIUM

RELATED APPLICATIONS

The present application is a National Phase of International Application No. PCT/JP2021/042131 filed Nov. 16, 2021, which claims priority to Japanese Application No. 2020-193371 filed Nov. 20, 2020.

TECHNICAL FIELD

The present invention relates to a flight path specification device and a computer readable storage medium.

BACKGROUND ART

Operators working in a factory perform various operations such as inspection of an industrial machine, installation of workpieces to an industrial machine, an operation applied to an industrial machine, or the like. To increase efficiency of such operations performed by operators, unmanned aircrafts have been utilized in recent years (for example, Patent Literature 1).

CITATION LIST

Patent Document

Patent Document 1: JP 2020-142326 A

SUMMARY OF THE INVENTION

Problem to be Solved by the Invention

When flying an unmanned aircraft inside a factory, however, it is required to prevent interference between the unmanned aircraft and an industrial machine inside a factory.

An object of the present invention is to provide a flight path specification device and a computer readable storage medium that can reliably prevent interference between an unmanned aircraft and an industrial machine.

Means for Solving Problem

A flight path specification device includes: a space information generation unit configured to, based on model data on a structure of an industrial machine and an operating state of the industrial machine, generate non-interference space information indicating a non-interference space in which the industrial machine and an unmanned aircraft do not interfere with each other; a command accepting unit configured to accept an operation command for the unmanned aircraft; and a path information generation unit configured to, based on the non-interference space information and the operation command, generate flight path information that specifies a flight path for the unmanned aircraft.

A computer readable storage medium stores an instruction for causing a computer to execute: based on model data on a structure of an industrial machine and an operating state of the industrial machine, generating non-interference space information indicating a non-interference space in which the industrial machine and an unmanned aircraft do not interfere with each other; accepting an operation command for the unmanned aircraft; and based on the non-interference space information and the operation command, generating flight path information that specifies a flight path of the unmanned aircraft.

Effect of the Invention

According to the present invention, it possible to reliably prevent interference between an unmanned aircraft and an industrial machine.

BRIEF DESCRIPTION OF DRAWINGS

FIG. 8 is a diagram illustrating of an example of information stored in a command information storage unit.

MODE(S) FOR CARRYING OUT THE INVENTION

One embodiment of the present invention will be described below with reference to the drawings. Note that not all combinations of features described in the following embodiment are necessarily required for solving the problem. Further, more detailed description than is needed may be omitted. Further, the following description of the embodiment and the drawings are provided for those skilled in the art to fully understand the present invention and are not intended to limit the scope of the claims.

First, the overall unmanned aircraft control system having a flight path specification device will be described.

Figure 1:
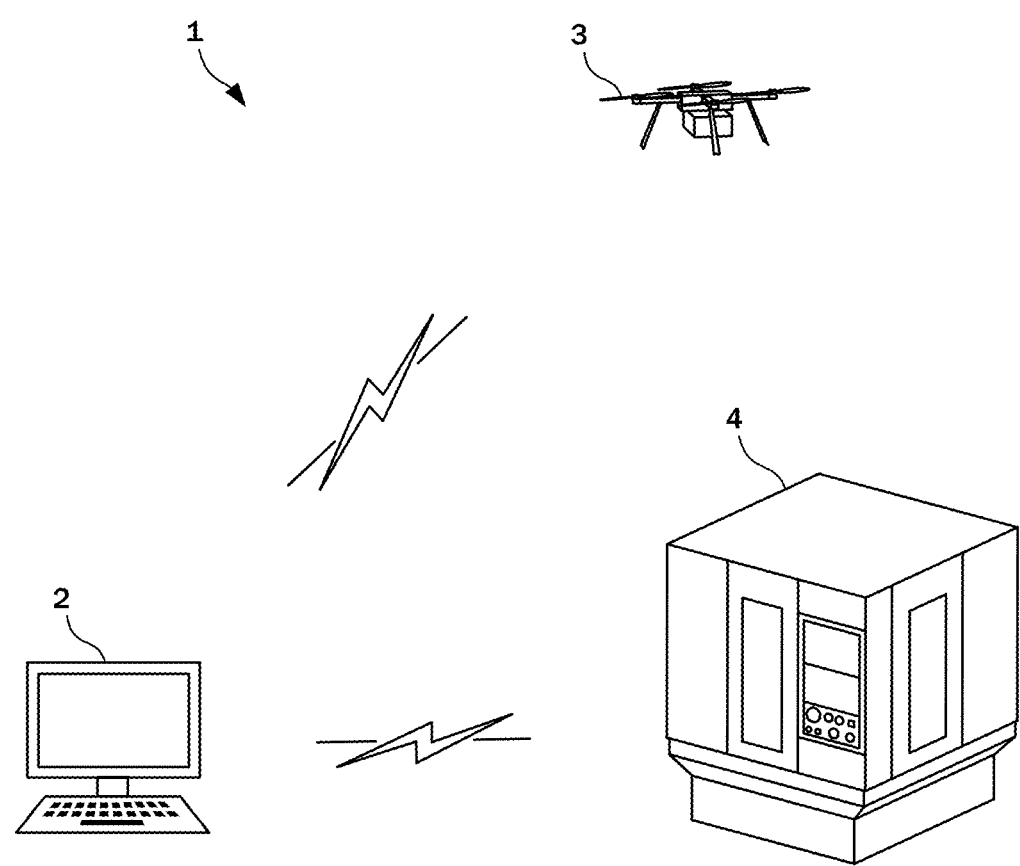
FIG. 1 is a diagram illustrating an example of an overall unmanned aircraft control system.

FIG. 1 is a diagram illustrating an example of an overall unmanned aircraft control system.

An unmanned aircraft control system 1 has a flight path specification device 2, an unmanned aircraft 3, and an industrial machine 4.

The flight path specification device 2 is a device that specifies a flight path of the unmanned aircraft 3. For example, the flight path specification device 2 is implemented in a personal computer (PC) or a server. For example, the flight path is a path along which the unmanned aircraft 3 flies near the industrial machine 4 and inside the industrial machine 4.

The unmanned aircraft 3 is a small unmanned aircraft of a multi-copter type. The unmanned aircraft 3 is called a drone. The unmanned aircraft 3 flies near the industrial machine 4 and inside the industrial machine 4 along a flight path specified by the flight path specification device 2. This enables the unmanned aircraft control system 1 to perform inspection on the industrial machine 4 or an operation applied to the industrial machine 4.

The industrial machine 4 is a device that is installed inside a factory and performs various operations. The industrial machine 4 is a machine tool, for example.

Next, the hardware configuration of respective devices of the unmanned aircraft control system 1 will be described.

Figure 2:
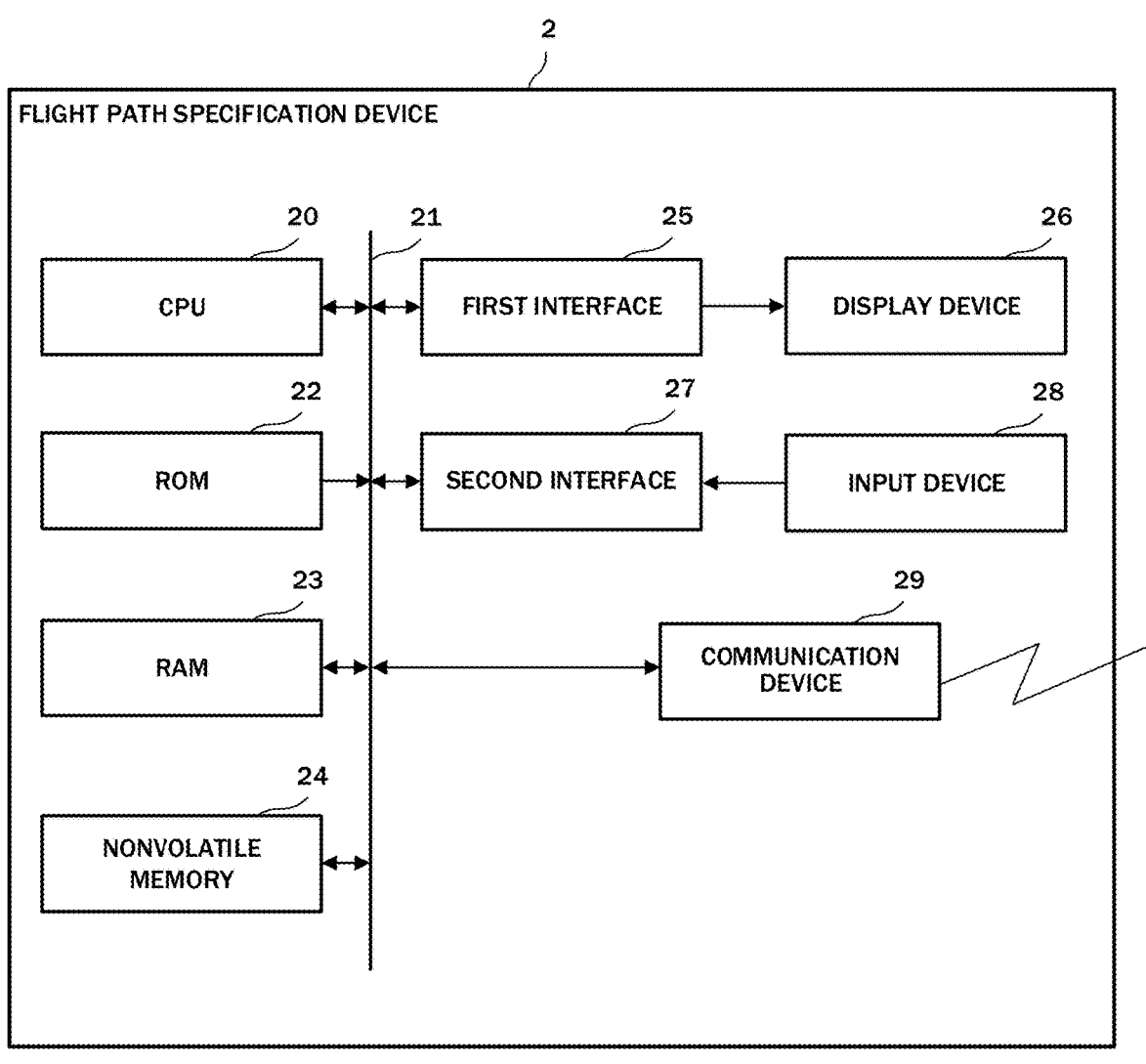
FIG. 2 is a diagram illustrating an example of a hardware configuration of a flight path specification device.

FIG. 2 is a diagram illustrating an example of the hardware configuration of the flight path specification device 2. The flight path specification device 2 has a central processing unit (CPU) 20, a bus 21, a read only memory (ROM) 22, a random access memory (RAM) 23, and a nonvolatile memory 24.

The CPU 20 is a processor that controls the overall flight path specification device 2 in accordance with a system program. The CPU 20 reads the system program or the like stored in the ROM 22 via the bus 21.

The bus 21 is a communication path that connects respective pieces of hardware within the flight path specification device 2 to each other. The respective pieces of hardware within the flight path specification device 2 exchange data via the bus 21.

The ROM 22 is a storage device that stores a system program or the like used for controlling the overall flight path specification device 2. The system program includes a flight path specification program that specifies a flight path of the unmanned aircraft 3.

The RAM 23 is a storage device that temporarily stores various data. For example, the RAM 23 temporarily stores data or the like on an operation command for the unmanned aircraft 3 that is input externally. The RAM 23 functions as a working area where the CPU 20 processes various data.

The nonvolatile memory 24 is a storage device that retains data even in a state where the flight path specification device 2 is powered off and the flight path specification device 2 is no longer supplied with power. The nonvolatile memory 24 includes a solid state drive (SSD), for example.

The flight path specification device 2 further has a first interface 25, a display device 26, a second interface 27, an input device 28, and a communication device 29.

The first interface 25 connects the bus 21 and the display device 26 to each other. For example, the first interface 25 transmits various data processed by the CPU 20 to the display device 26.

The display device 26 receives various data via the first interface 25 and displays the various data. The display device 26 is a display such as a liquid crystal display (LCD).

The second interface 27 connects the bus 21 and the input device 28 to each other. For example, the second interface 27 transmits data, which is input from the input device 28, to the CPU 20 via the bus 21.

The input device 28 is a device for inputting various data. For example, the input device 28 receives input of data and transmits the input data to the nonvolatile memory 24 via the second interface 27. The input device 28 is a keyboard and a mouse, for example. Note that the input device 28 and the display device 26 may be configured as a single device such as a touch panel, for example.

The communication device 29 is a device that performs wireless communication with the unmanned aircraft 3. The communication device 29 performs communication by using a wireless LAN or Bluetooth, for example.

Further, the communication device 29 is a device that communicates with the industrial machine 4 by wire or wirelessly. The communication device 29 communicates with the industrial machine 4 by using the Internet line, for example.

Next, the hardware configuration of the unmanned aircraft 3 will be described.

Figure 3:
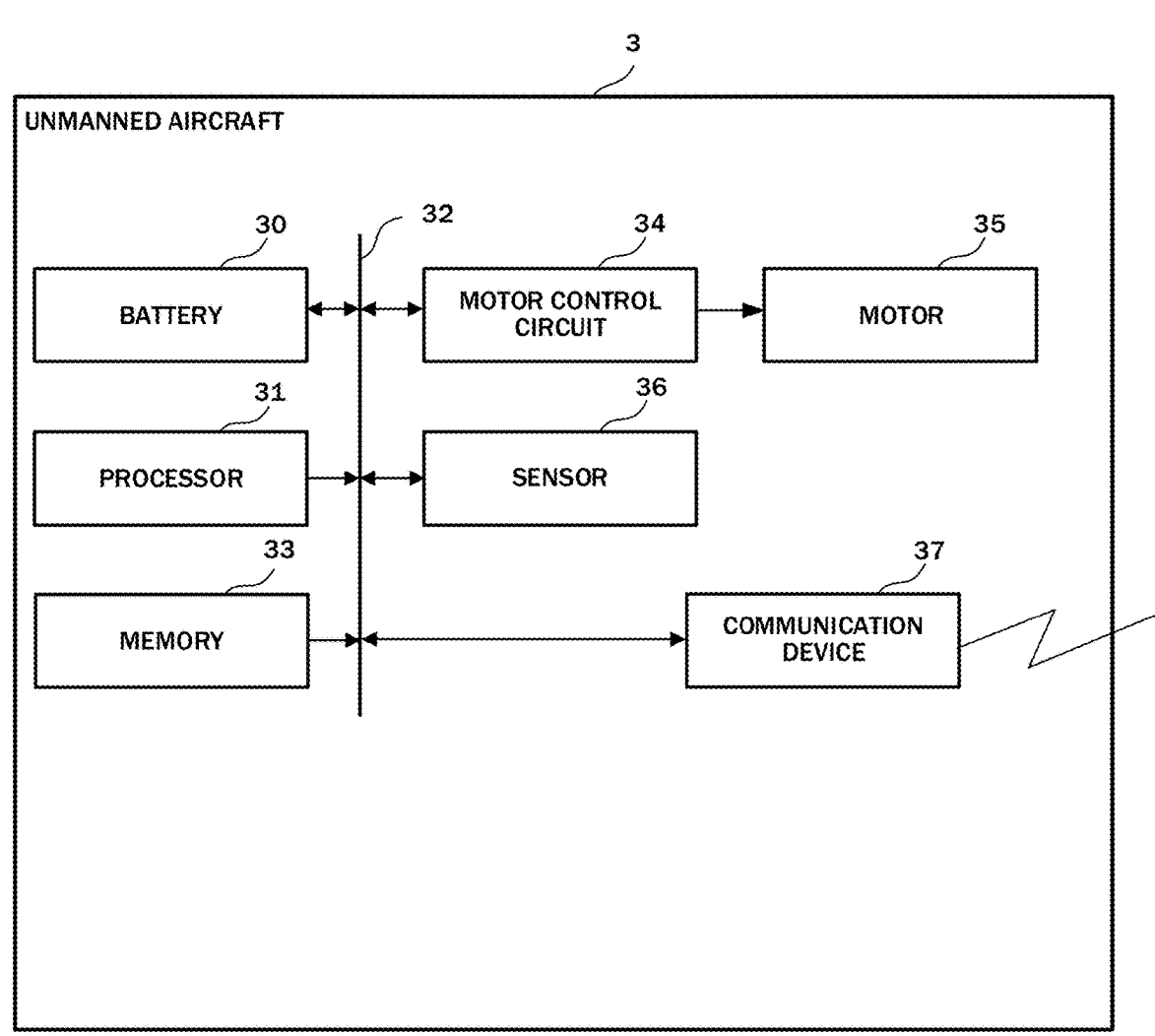
FIG. 3 is a diagram illustrating an example of a hardware configuration of an unmanned aircraft.

FIG. 3 is a diagram illustrating an example of the hardware configuration of the unmanned aircraft 3. The unmanned aircraft 3 has a battery 30, a processor 31, a bus 32, a memory 33, a motor control circuit 34, a motor 35, a sensor 36, and a communication device 37.

The battery 30 supplies power to each part of the unmanned aircraft 3. The battery 30 is a lithium-ion battery, for example.

The processor 31 controls the overall unmanned aircraft 3 in accordance with a control program. The processor 31 functions as a flight controller, for example. The processor 31 is a CPU, for example.

The bus 32 is a communication path that connects respective pieces of hardware within the unmanned aircraft 3 to each other. The respective pieces of hardware within the unmanned aircraft 3 exchange data via the bus 32.

The memory 33 is a storage device that stores various programs, data, and the like. For example, the memory 33 stores a control program used for controlling the overall unmanned aircraft 3. For example, the memory 33 is at least any one of a ROM, a RAM, and an SSD.

The motor control circuit 34 is a circuit for controlling the motor 35. The motor control circuit 34 drives and controls the motor 35 in response to receiving a control command from the processor 31.

The motor 35 is controlled by the motor control circuit 34. The motor 35 rotates a propeller fixed to a rotary shaft. Note that, although FIG. 3 depicts a single motor 35, the unmanned aircraft 3 has four motors 35, for example, and the motor control circuit 34 controls rotation of each of the motors 35 to fly the unmanned aircraft 3.

The sensor 36 is a device that detects various state of the industrial machine 4. The sensor 36 is an image sensor, for example. For example, the sensor 36 captures a display image on the display device 26 of the industrial machine 4 to detect the operating state of the industrial machine 4.

Further, the sensor 36 includes a ranging sensor, for example. For example, the sensor 36 measures the distance to a mark provided on a predetermined location on the industrial machine 4. The ranging sensor may be a ranging sensor using infrared rays, radio waves, or ultrasonic waves, for example. The sensor 36 may include an electronic compass, for example. The electronic compass senses the earth magnetism and acquires the direction in which the unmanned aircraft 3 is directed. Further, the sensor 36 may include an acceleration sensor, an angular velocity sensor, or the like.

The communication device 37 communicates with the flight path specification device 2 through wireless communication. As described above, the communication device 37 performs communication by using a wireless LAN or Bluetooth, for example.

Next, the hardware configuration of the industrial machine 4 will be described.

Figure 4:
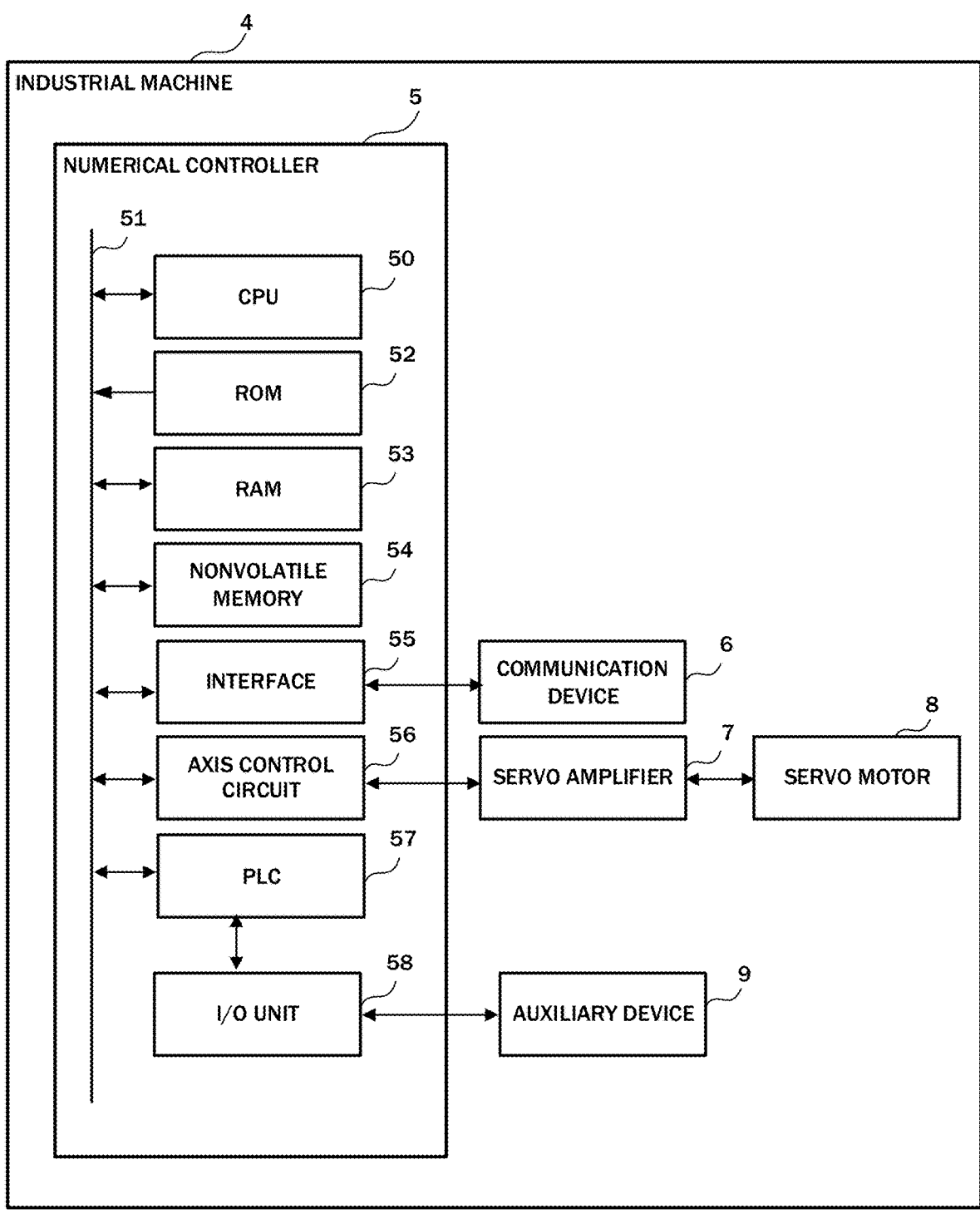
FIG. 4 is a diagram illustrating an example of a hardware configuration of an industrial machine.

FIG. 4 is a diagram illustrating an example of the hardware configuration of the industrial machine 4. The industrial machine 4 has a numerical controller 5, a communication device 6, a servo amplifier 7, a servo motor 8, and an auxiliary device 9.

The numerical controller 5 is a device that controls the overall industrial machine 4. The numerical controller 5 includes a CPU 50, a bus 51, a ROM 52, a RAM 53, and a nonvolatile memory 54.

The CPU 50 is a processor that controls the overall numerical controller 5 in accordance with a system program. The CPU 50 reads a system program or the like stored in the ROM 52 via the bus 51. Further, the CPU 50 controls the servo motor 8 and a spindle motor (not illustrated) in accordance with a machining program to machine a workpiece.

The bus 51 is a communication path that connects respective pieces of hardware within the numerical controller 5 to each other. The respective pieces of hardware within the numerical controller 5 exchange data via the bus 51.

The ROM 52 is a storage device that stores a system program or the like used for controlling the overall numerical controller 5.

The RAM 53 is a storage device that temporarily stores various data. The RAM 53 functions as a working area where the CPU 50 processes various data.

The nonvolatile memory 54 is a storage device that retains data even in a state where the industrial machine 4 is powered off and the numerical controller 5 is no longer supplied with power. The nonvolatile memory 54 includes a solid state drive (SSD), for example.

The numerical controller 5 further includes an interface 55, an axis control circuit 56, a programmable logic controller (PLC) 57, and an I/O unit 58.

The interface 55 is a communication path that connects the bus 51 and the communication device 6 to each other. For example, the interface 55 transmits, to the CPU 50, various data received by the communication device 6.

The communication device 6 communicates with the flight path specification device 2. As described above, the communication device 6 communicates with the flight path specification device 2 by using the Internet line, for example.

The axis control circuit 56 is a circuit that controls the servo motor 8. The axis control circuit 56 outputs a command for driving the servo motor 8 to the servo amplifier in response to receiving a control command from the CPU 50. For example, the axis control circuit 56 transmits a torque command that controls the torque of the servo motor 8 to the servo amplifier 7.

The servo amplifier 7 supplies power to the servo motor 8 in response to receiving a command from the axis control circuit 56.

The servo motor 8 is driven in response to receiving power supply from the servo amplifier 7. When the industrial machine 4 is a machine tool, the servo motor 8 is coupled to a ball screw that drives a tool post, a spindle head, or a table, for example. When the servo motor 8 is driven, the structure of a machine tool such as a tool post, a spindle head, or a table is then moved in an X-axis direction, a Y-axis direction, or a Z-axis direction, for example.

The PLC 57 is a device that executes a ladder program to control the auxiliary device 9. The PLC 57 controls the auxiliary device 9 via the I/O unit 58.

The I/O unit 58 is an interface that connects the PLC 57 and the auxiliary device 9 to each other. The I/O unit 58 transmits a command received from the PLC 57 to the auxiliary device 9.

The auxiliary device 9 is installed to the industrial machine 4 and performs auxiliary operations when the industrial machine 4 performs machining on a workpiece. The auxiliary device 9 may be a device installed around the industrial machine 4. The auxiliary device 9 may be, for example, a tool changer, a cutting fluid ejection device, or an open/close door driving device.

Next, the function of each unit of the flight path specification device 2 will be described.

Figure 5:
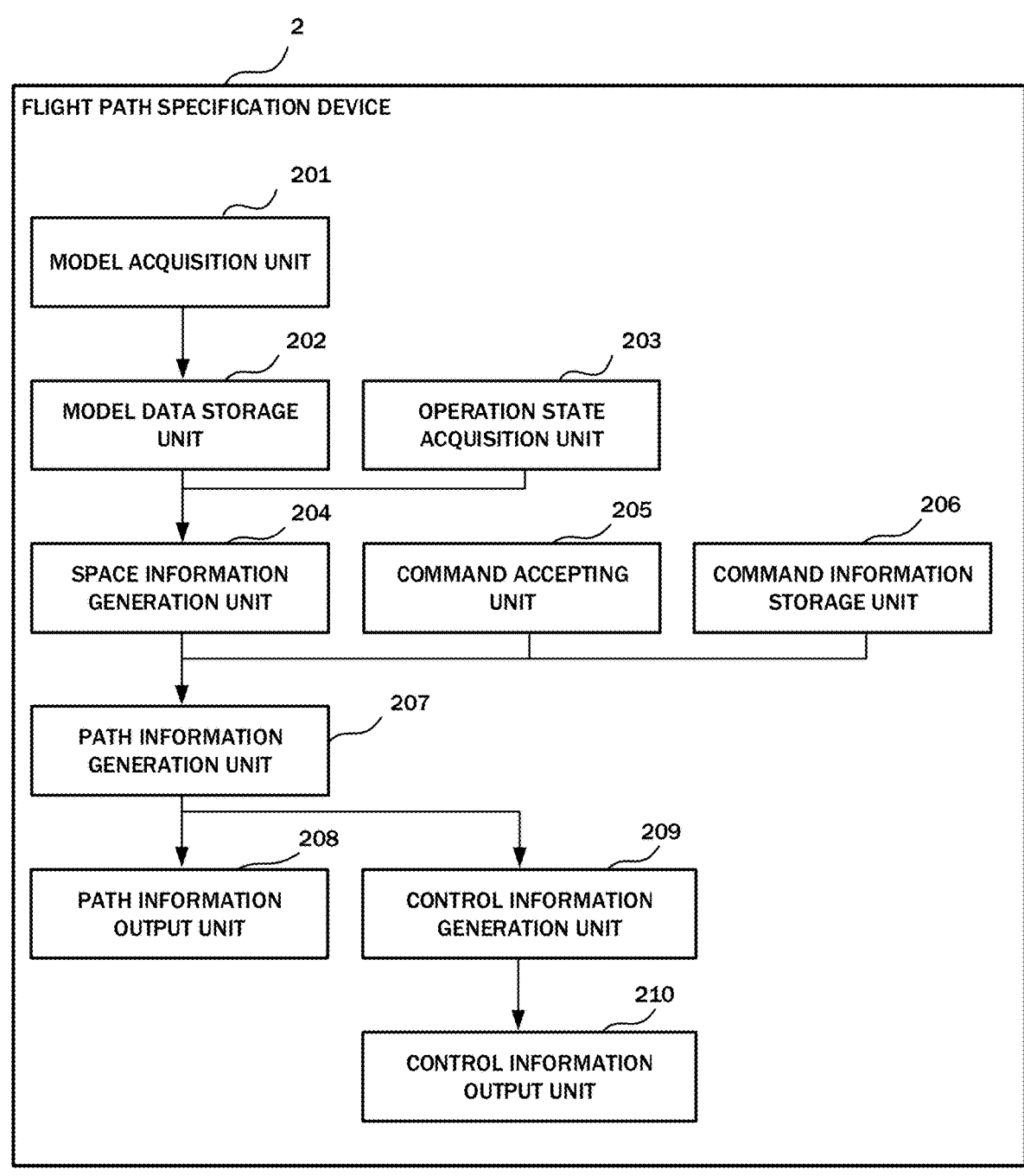
FIG. 5 is a diagram illustrating an example of functions of the flight path specification device.

FIG. 5 is a block diagram illustrating an example of the function of each unit of the flight path specification device 2. The flight path specification device 2 includes a model acquisition unit 201, a model data storage unit 202, an operating state acquisition unit 203, a space information generation unit 204, a command accepting unit 205, a command information storage unit 206, a path information generation unit 207, a path information output unit 208, a control information generation unit 209, and a control information output unit 210.

The model acquisition unit 201, the operating state acquisition unit 203, the space information generation unit 204, the command accepting unit 205, the path information generation unit 207, the path information output unit 208, the control information generation unit 209, and the control information output unit 210 are realized by the CPU 20 performing arithmetic processing using a system program stored in the ROM 22 and various data, for example. Further, the model data storage unit 202 and the command information storage unit 206 are realized by data input from the input device or the like or a calculation result of arithmetic processing by the CPU 20 being stored in the RAM 23 or the nonvolatile memory 24, for example.

The model acquisition unit 201 acquires model data indicating a three-dimensional model of a structure of the industrial machine 4 from the numerical controller 5. The structure of the industrial machine 4 may be, for example, a spindle, a spindle head, a table, a splash guard, an open/close door, and various covers. Further, the structure of the industrial machine 4 includes a tool, a workpiece, a jig, or the like. The model data is three-dimensional computer aided design (CAD) data, for example. The model acquisition unit 201 may acquire model data indicating a three-dimensional model from a management server or the like that manage a plurality of industrial machines 4.

Figure 6:
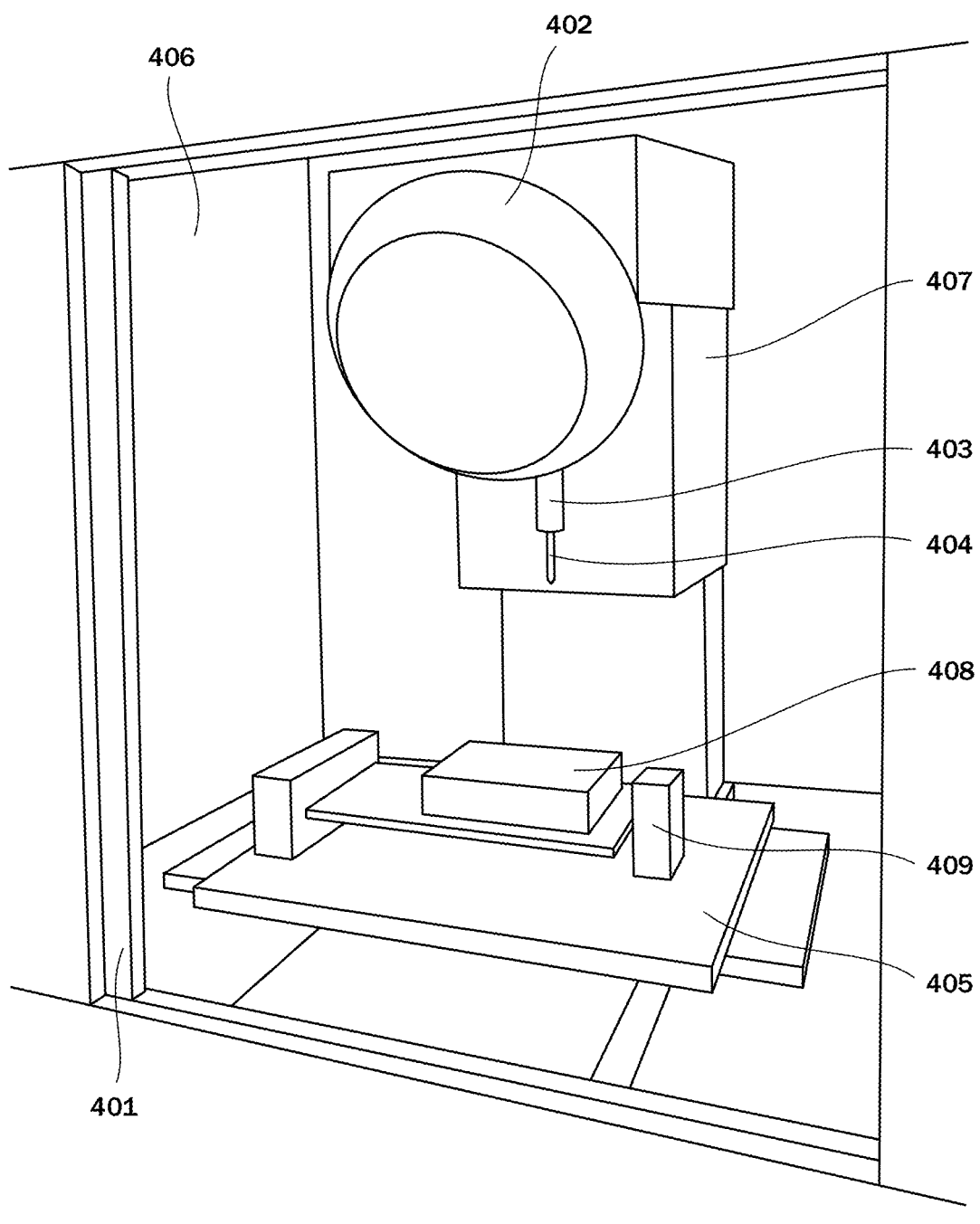
FIG. 6 is a diagram illustrating an example of a three-dimensional model of an industrial machine.

FIG. 6 is a diagram illustrating an example of a three-dimensional model of structures of the industrial machine 4. The three-dimensional model is a model used for simulating interference among each structure, a tool, and a workpiece in the industrial machine 4, for example.

FIG. 6 illustrates a three-dimensional model of an open/close door 401, a turret 402, a spindle 403, a tool 404, a table 405, a splash guard 406, a telescopic cover 407, a workpiece 408, a jig 409, and the like.

Here, description returns to FIG. 5.

The model data storage unit 202 stores model data on the industrial machine 4 acquired by the model acquisition unit 201.

Further, the model data storage unit 202 stores model data indicating a three-dimensional model of the unmanned aircraft 3. This model data is a three-dimensional CAD data, for example. The model data indicating the three-dimensional model of the unmanned aircraft 3 is acquired from an external server or the like by the communication device 29, for example. Note that the three-dimensional model of the unmanned aircraft 3 may be simplified. For example, a cylindrical shape model may be used as the model of the unmanned aircraft 3.

The operating state acquisition unit 203 acquires information indicating the operating state of the industrial machine 4 from the numerical controller 5. The information indicating the operating state may be, for example, information indicating an open/closed state of a door, information indicating an ON/OFF state of a cutting fluid, information about the tool 404 attached to the spindle 403, or information indicating a position of each structure. For example, the operating state acquisition unit 203 may acquire the operating state of the industrial machine 4 from a machining program executed by the numerical controller 5.

The space information generation unit 204 generates non-interference space information indicating a non-interference space in which the industrial machine 4 and the unmanned aircraft 3 do not interfere with each other based on model data of a structure of the industrial machine 4, model data of the unmanned aircraft 3, and the operating state of the industrial machine 4. The non-interference space is a space in which the unmanned aircraft 3 can fly without colliding with the industrial machine 4 near the industrial machine 4 or inside the industrial machine 4.

Figure 7:
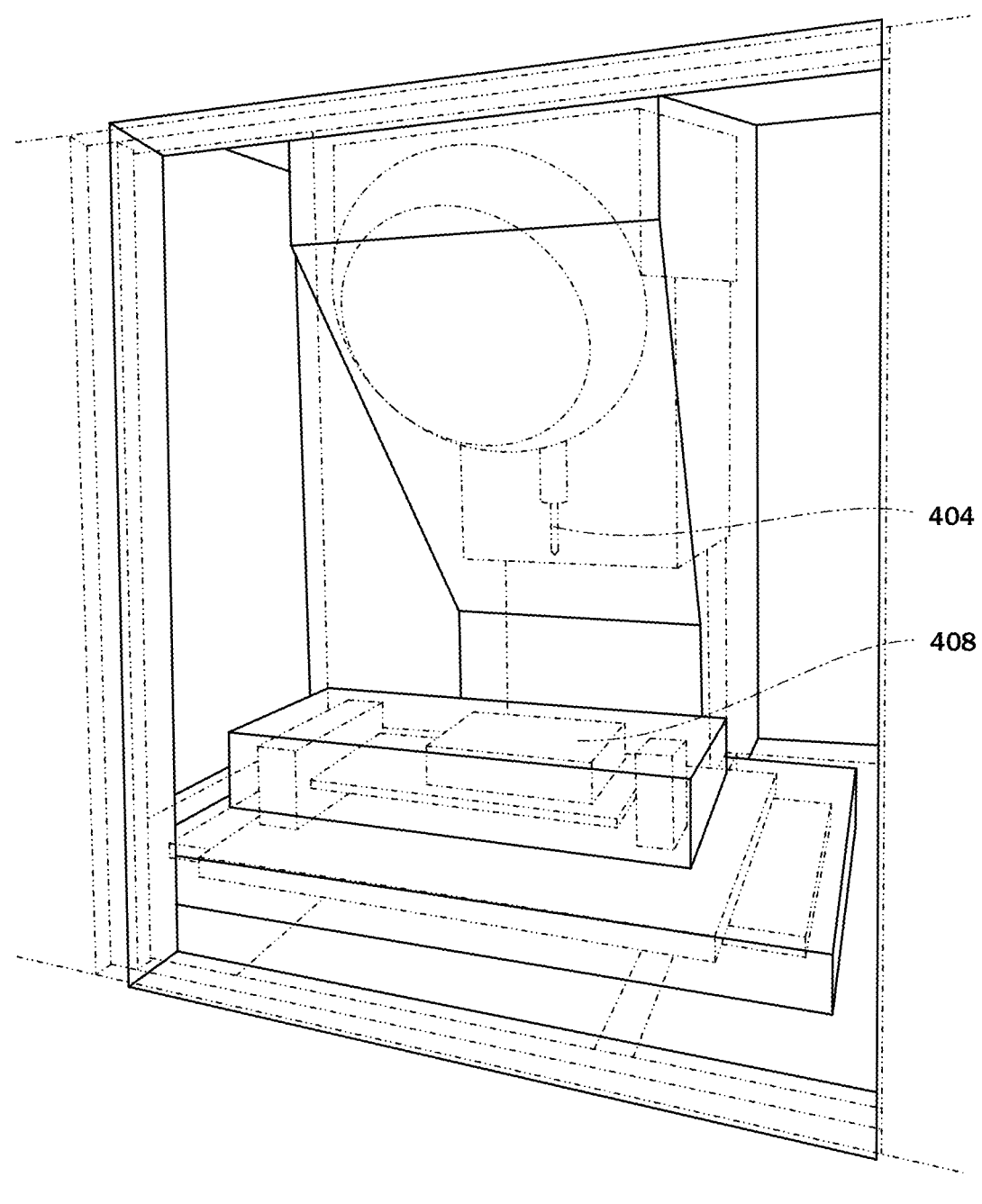
FIG. 7 is a diagram illustrating an example of a non-interference space.

FIG. 7 is a diagram illustrating an example of the non-interference space. For example, the non-interference space is defined by a plurality of surfaces separated by a predetermined distance from outer surfaces of each structure of the industrial machine 4, the tool 404, and the workpiece 408. In FIG. 7, the space between the structure depicted by the two-dot chain line and the surface depicted by the solid line is the interference spaces, and the remaining space is the non-interference space. The distance from a structure or the like to a position to define the non-interference space is determined by taking into consideration a factor such as a degree of accuracy at which the unmanned aircraft 3 can be controlled, for example.

Further, the non-interference space may be defined so as not to include a space where a cutting fluid may be scattered. For example, when a cutting fluid is being ejected from a nozzle or the like, a pre-defined space may be excluded from the non-interference space.

The command accepting unit 205 accepts an operation command for an operation to be performed by the unmanned aircraft 3. For example, the operation command is a command for an inspection operation to inspect the industrial machine 4 or a command for a transport operation to transport the workpiece 408.

The inspection operation is, for example, an operation to capture an image of a monitor or the like displaying the temperature of a cutting fluid or an operation to capture an image of an edge of the tool 404.

The transport operation for the workpiece 408 is, for example, an operation in which the unmanned aircraft 3 installs the workpiece 408 on the table 405 by using a workpiece holder that attracts the workpiece 408 by electromagnetic force.

The command information storage unit 206 stores information in which an operation command to the unmanned aircraft 3 and a coordinate value of an operation position of an operation performed by the unmanned aircraft 3 are associated with each other, for example. The operation command is a command that specifies an operation to be performed by the unmanned aircraft 3. Further, the operation position is a flight position when the unmanned aircraft 3 performs an operation in accordance with an operation command.

FIG. 8 is a diagram illustrating an example of information stored in the command information storage unit 206.

The command information storage unit 206 stores operation commands and operation positions in association with each other. For example, the command information storage unit 206 stores "Image capturing of thermometer", which is an operation command, and a coordinate value (X1, Y1, Z1), which represents an operation position, in association with each other.

Further, the command information storage unit 206 stores "Image capturing of tool edge", which is an operation command, and a coordinate value (X2, Y2, Z2), which represents an operation position, in association with each other. Further, the command information storage unit 206 stores "Installation of workpiece", which is an operation command, and a coordinate value (X3, Y3, Z3), which represents an operation position, in association with each other.

Here, description returns to FIG. 5.

The path information generation unit 207 generates flight path information that specifies a flight path of the unmanned aircraft 3. The path information generation unit 207 specifies an operation position at which the unmanned aircraft 3 performs an operation based on an operation command accepted by the command accepting unit 205 and information stored in the command information storage unit 206. Further, the path information generation unit 207 specifies a flight path to an operation position in the non-interference space based on non-interference space information generated by the space information generation unit 204 and an operation position. Accordingly, flight path information is generated.

For example, when the command accepting unit 205 accepts an operation command indicating "Image capturing of tool edge", the path information generation unit 207 generates flight path information that specifies a flight path from the current location of the unmanned aircraft 3 to an operation position based on the non-interference space information and the coordinate value (X2, Y2, Z2).

The path information generation unit 207 generates flight path information by using a search algorithm to search for the shortest path to the operation position indicated by the coordinate value (X2, Y2, Z2) in the non-interference space, for example.

Figure 9:
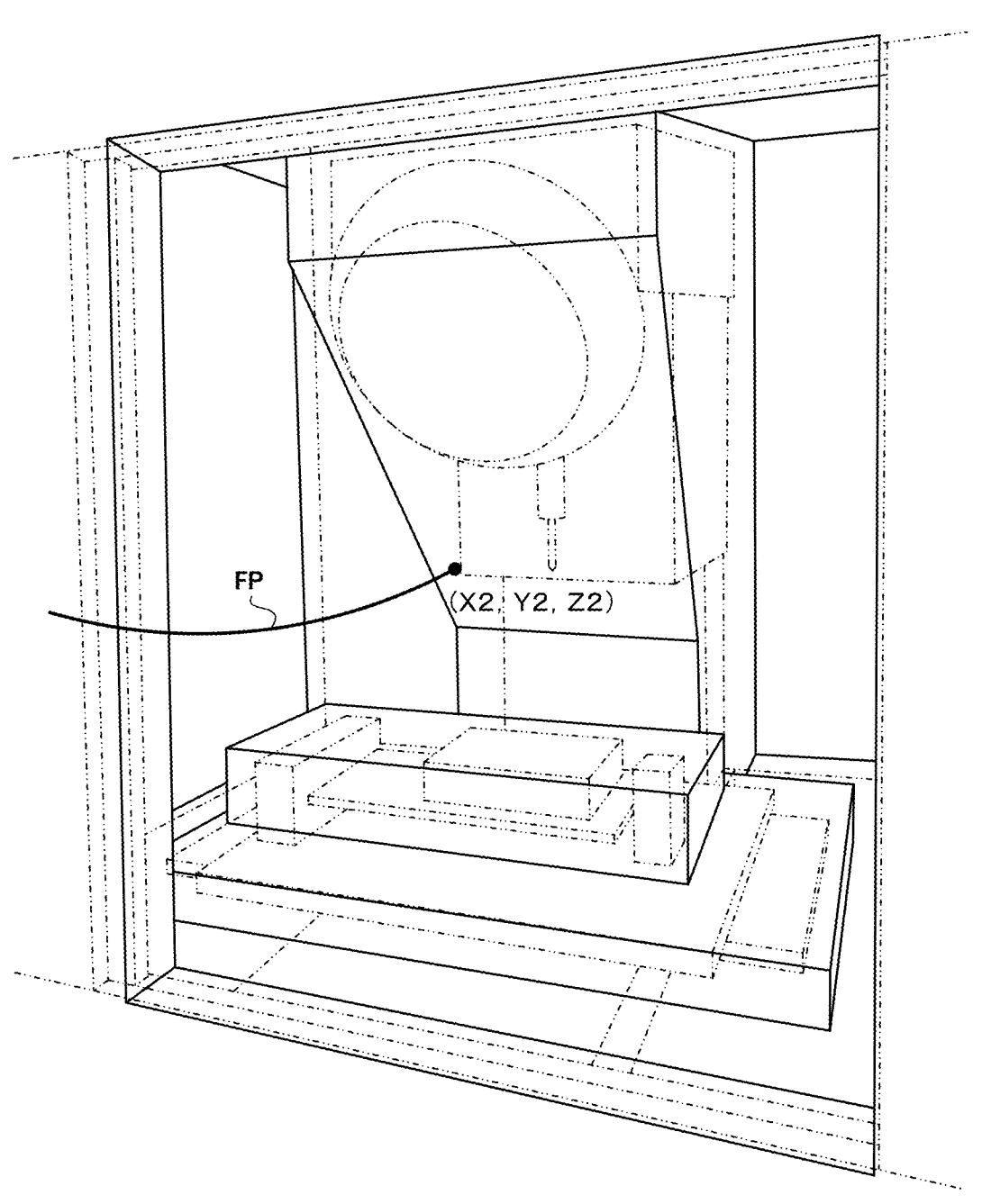
FIG. 9 is a diagram illustrating an example of a flight path.

FIG. 9 is a diagram illustrating a flight path when "Image capturing of tool edge" is instructed as an operation command. The flight path FP is the shortest path for the unmanned aircraft 3 to reach the operation position indicated by the coordinate value (X2, Y2, Z2).

When no flight path information that specifies the flight path FP can be generated, the path information generation unit 207 cancels the generation of flight path information. A case where no flight path information can be generated is a case where, in the non-interference space, no flight path FP can be specified along which the unmanned aircraft 3 reaches an operation position without colliding with any structure of the industrial machine 4 or the like.

Here, description returns to FIG. 5.

The path information output unit 208 outputs flight path information generated by the path information generation unit 207. The path information output unit 208 transmits flight path information to the unmanned aircraft 3 by using a communication device, for example.

The control information generation unit 209 generates control information on the industrial machine 4. As described above, when the path information generation unit 207 cancels generation of flight path information, the control information generation unit 209 generates control information used for moving a structure of the industrial machine 4.

Figure 10:
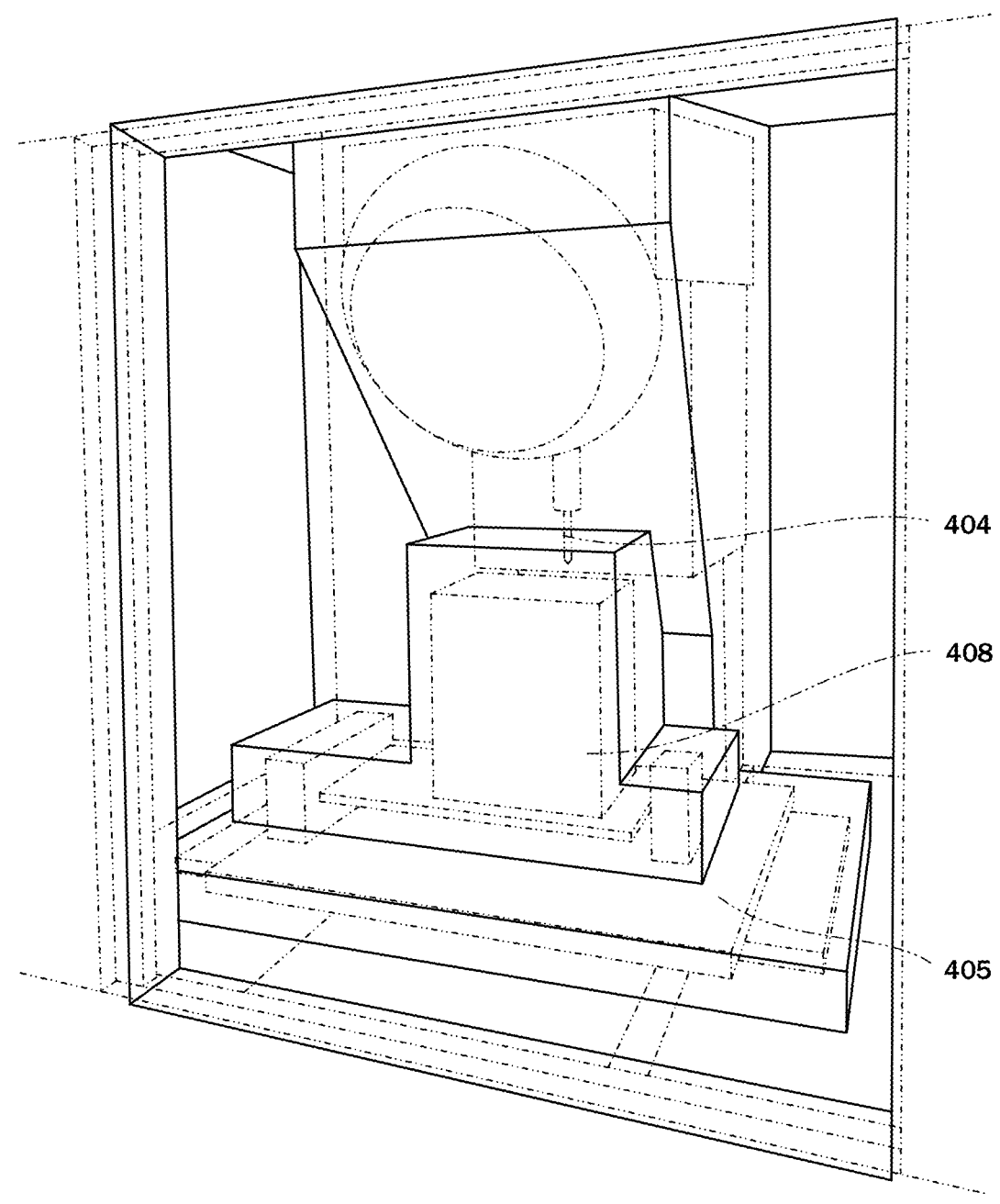
FIG. 10 is a diagram illustrating an example of a non-interference space.

For example, as illustrated in FIG. 10, when the unmanned aircraft 3 is unable to approach the tool 404 because a large workpiece 408 is installed on the table 405, the control information generation unit 209 generates control information used for moving the table 405 of the industrial machine 4 along the Y-axis direction.

Figure 11:
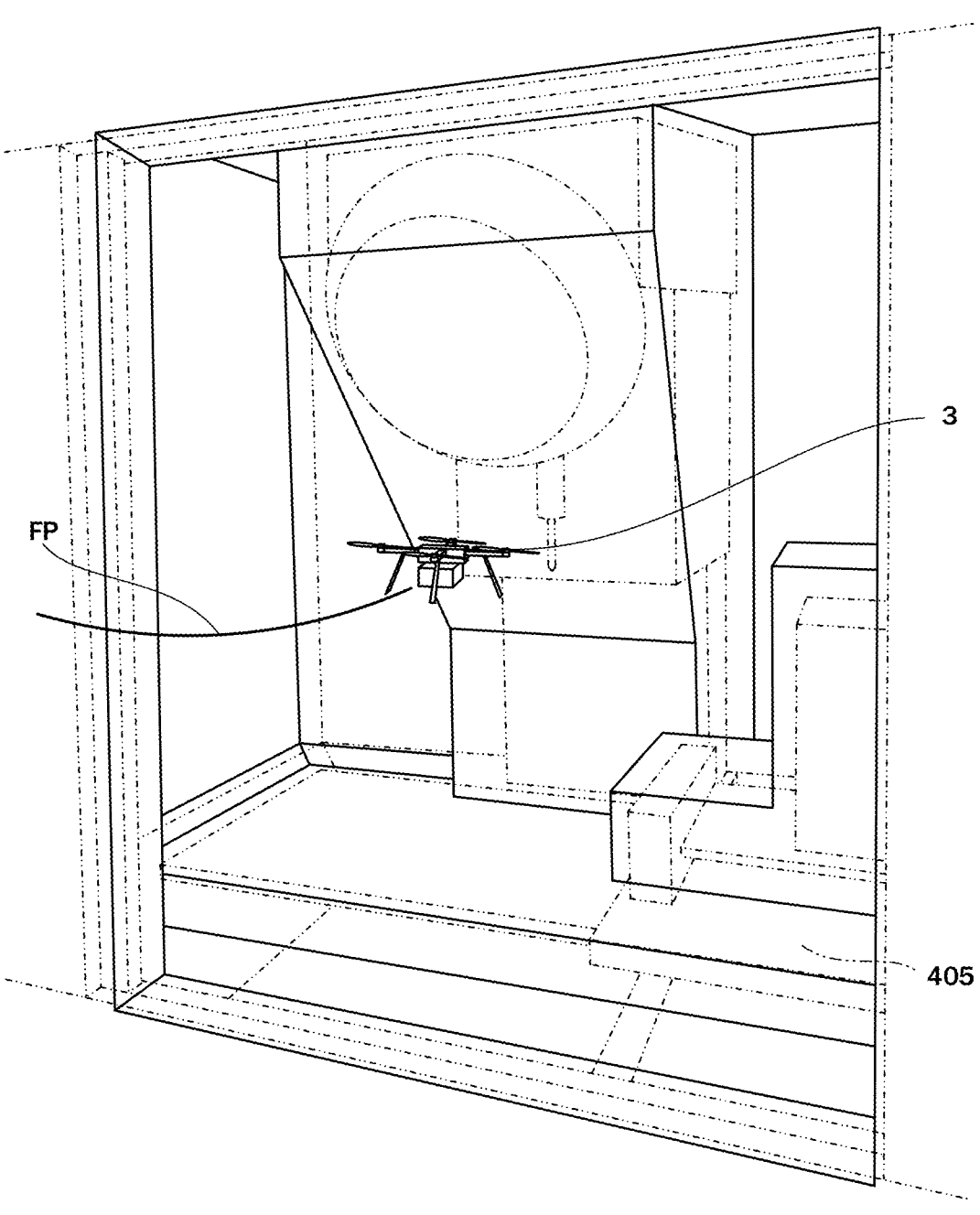
FIG. 11 is a diagram illustrating an example of a non-interference space.

The control information output unit 210 outputs control information generated by the control information generation unit 209. The control information output unit 210 transmits control information to the numerical controller 5 by using a communication device, for example. In response to receiving a control command, the numerical controller 5 ensures the flight path FP of the unmanned aircraft 3 by moving the table 405, for example, as illustrated in FIG. 11. That is, the flight path specification device 2 indirectly controls the motion of a structure of the industrial machine 4 by using the control information generation unit 209 and the control information output unit 210.

Note that, when control information on the industrial machine 4 is output by the control information output unit 210, the operating state acquisition unit 203 may again acquire information indicating the operating state of the industrial machine 4. In such a case, the space information generation unit 204 can generate non-interference space information again, and the path information generation unit 207 can generate flight path information.

Further, when flight path information is output by the path information output unit 208, the control information generation unit 209 may generate control information used for prohibiting the operation of the industrial machine 4. Further, when flight path information is output by the path information output unit 208, the control information generation unit 209 may generate control information used for prohibiting motion of a structure.

Next, the function of each unit of the unmanned aircraft 3 will be described.

Figure 12:
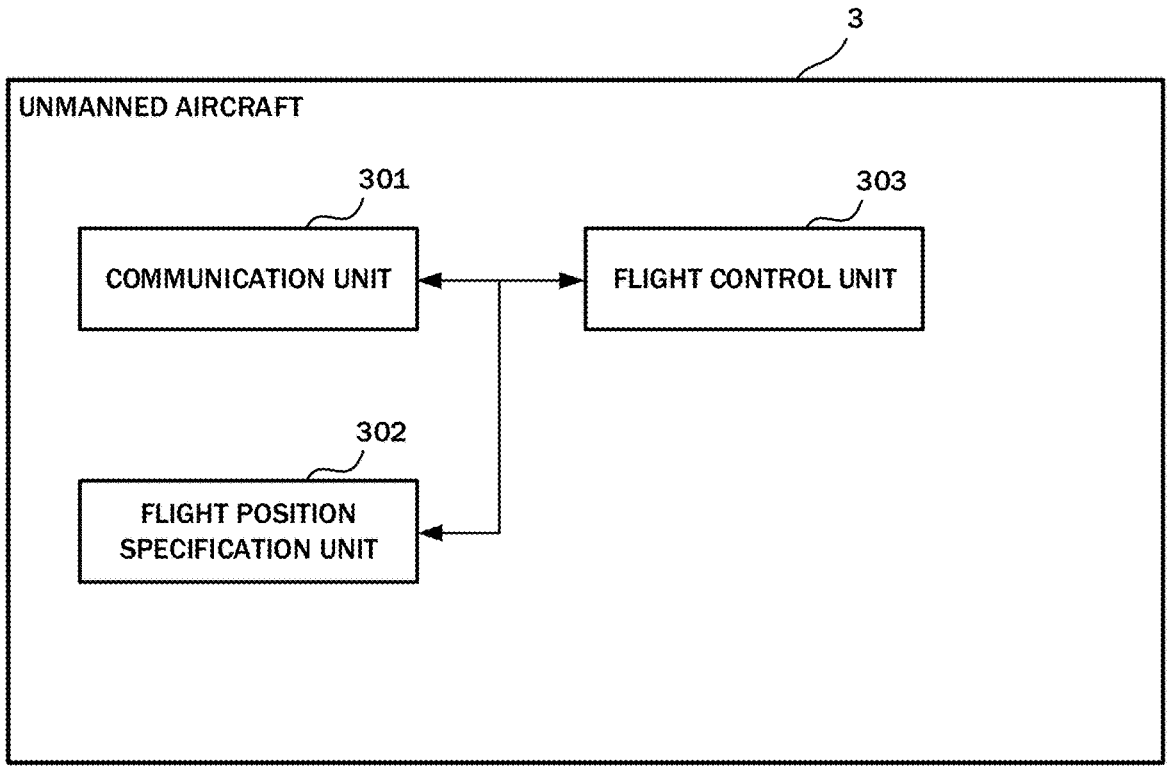
FIG. 12 is a diagram illustrating an example of functions of an unmanned aircraft.

FIG. 12 is a block diagram illustrating an example of the function of each unit of the unmanned aircraft 3.

The unmanned aircraft 3 has a communication unit 301, a flight position specification unit 302, and a flight control unit 303.

The communication unit 301 communicates with the flight path specification device 2. The communication unit 301 acquires flight path information from the flight path specification device 2, for example.

The flight position specification unit 302 specifies the flight position of the unmanned aircraft 3. For example, the flight position specification unit 302 uses the sensor 36 to detect marks provided inside a factory and provided on the industrial machine 4 and thereby specifies the flight position and the orientation of the unmanned aircraft 3. Further, when the unmanned aircraft 3 has a global positioning system (GPS) receiver, the flight position specification unit 302 may specify the flight position of the unmanned aircraft 3 by using GPS. Alternatively, the unmanned aircraft 3 may be detected by a sensor installed inside a factory or installed to the industrial machine 4, and the flight position specification unit 302 may calculate the position and the orientation of the unmanned aircraft 3 based on detection information received from the sensor. Alternatively, these methods may be combined to specify the position of the unmanned aircraft 3.

The flight control unit 303 performs flight control on the unmanned aircraft 3 based on flight path information acquired by the communication unit 301 and position information on the unmanned aircraft 3 specified by the flight position specification unit 302. The flight control unit 303 performs flight control by controlling the rotation speed of each motor. The flight control unit 303 causes the unmanned aircraft 3 to fly along the flight path FP indicated by flight path information. Further, the flight control unit 303 may perform feedback control by using information indicating the flight position of the unmanned aircraft 3 specified by the flight position specification unit 302.

Next, the function of each unit of the numerical controller 5 of the industrial machine 4 will be described.

Figure 13:
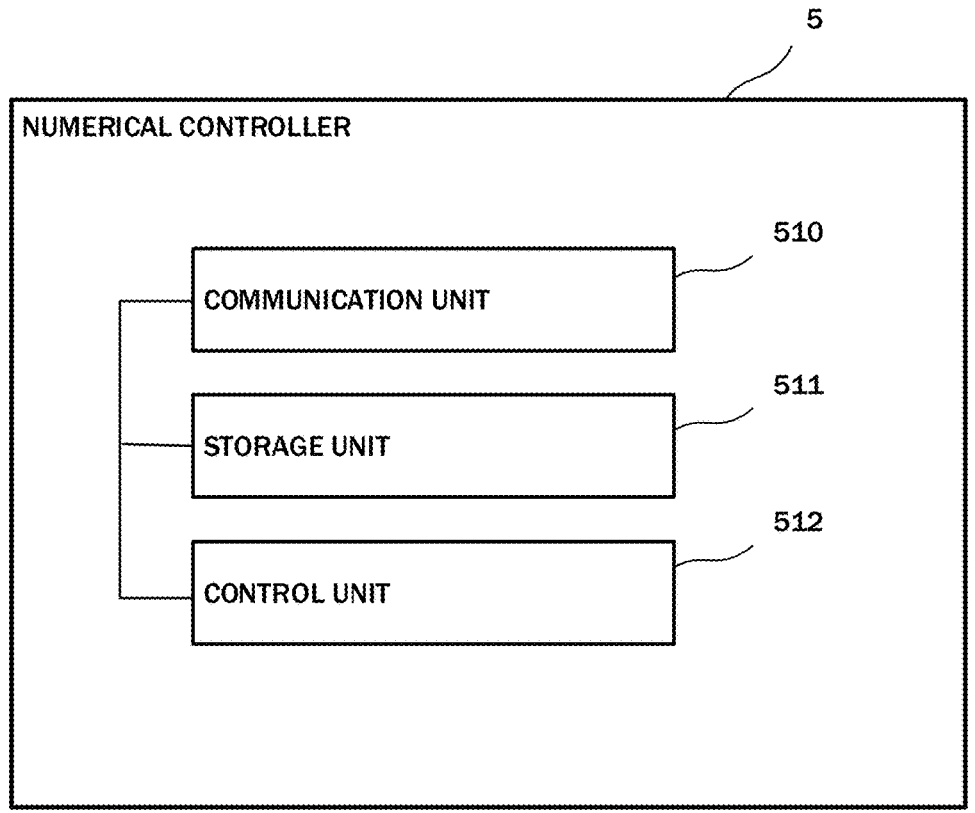
FIG. 13 is a diagram illustrating an example of functions of a numerical controller.

FIG. 13 is a block diagram illustrating an example of the function of each unit of the numerical controller 5.

The numerical controller 5 includes a communication unit 510, a storage unit 511, and a control unit 512.

The communication unit 510 communicates with the flight path specification device 2. For example, the communication unit 510 receives control information output from the control information output unit 210 of the flight path specification device 2. Further, the communication unit 510 transmits information indicating the operating state of the industrial machine 4 to the flight path specification device 2.

The storage unit 511 stores a system program used for controlling the overall numerical controller 5, a machining program, or information about tool offset, for example. Further, the storage unit 511 stores model data indicating the three-dimensional model of structures of the industrial machine 4. The model data stored in the storage unit 511 is transmitted to the flight path specification device 2 by the communication unit 510.

The control unit 512 controls the overall industrial machine 4. The control unit 512 performs machining on the workpiece 408 in accordance with a machining program, for example. Further, the control unit 512 moves a structure of the industrial machine 4 based on control information received by the communication unit 510. The control unit 512 performs control to move the spindle head in the Z-axis direction, for example. Further, the control unit 512 performs control to move the table 405 in the X-axis direction and the Y-axis direction. Further, the control unit 512 controls ejection and stop of the ejection of a cutting fluid or opening and closing of the open/close door 401.

Next, a flow of a process performed in the flight path specification device 2 will be described.

Figure 14:
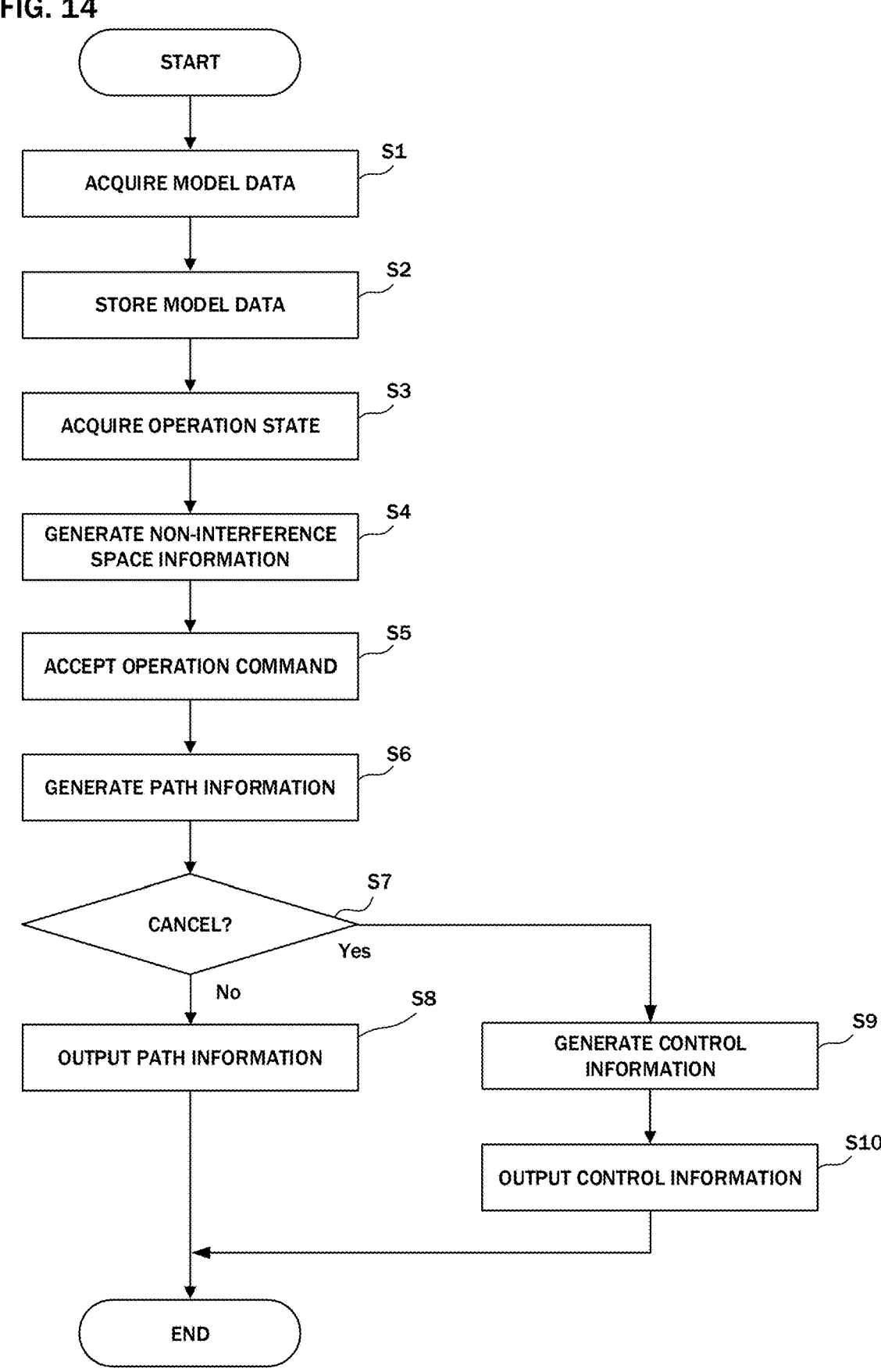
FIG. 14 is a flowchart illustrating an example of a process performed in the flight path specification device.

FIG. 14 is a flowchart illustrating an example of a process performed in the flight path specification device 2.

First, the model acquisition unit 201 acquires, from the industrial machine 4, model data indicating a three-dimensional model of the industrial machine 4 (step S1).

Next, the model data storage unit 202 stores the model data acquired by the model acquisition unit 201 (step S2).

Next, the operating state acquisition unit 203 acquires information indicating the operating state of the industrial machine 4 from the numerical controller 5 (step S3).

Next, the space information generation unit 204 generates non-interference space information indicating a non-interference space based on the model data on structures of the industrial machine 4, the model data on the unmanned aircraft 3, and the operating state of the industrial machine 4 (step S4).

Next, the command accepting unit 205 accepts an operation command for an operation to be performed by the unmanned aircraft 3 (step S5).

Next, based on the non-interference space information and the operation command, the path information generation unit 207 generates flight path information that specifies the flight path FP of the unmanned aircraft 3 (step S6).

If the flight path information is generated by the path information generation unit 207 (step S7, No), the path information output unit 208 outputs the flight path information (step S8), and the process ends.

If the generation of the flight path information is cancelled by the path information generation unit 207 (step S7, Yes), the control information generation unit 209 generates control information on the industrial machine 4 (step S9).

Next, the control information output unit 210 outputs the control information generated by the control information generation unit 209 (step S10), and the process ends.

As described above, if the control information output unit 210 outputs the control information, the operating state acquisition unit 203 may again acquire, from the industrial machine 4, information indicating the latest operating state of the industrial machine 4. That is, the flight path specification device 2 may return to the process of step S3 after performing the process of step S10.

As described above, the flight path specification device 2 includes: the space information generation unit 204 that, based on model data on a structure of the industrial machine 4 and an operating state of the industrial machine 4, generates non-interference space information indicating a non-interference space in which the industrial machine 4 and the unmanned aircraft 3 do not interfere with each other; the command accepting unit 205 that accepts an operation command for the unmanned aircraft 3; and the path information generation unit 207 that, based on the non-interference space information and the operation command, generates flight path information that specifies a flight path FP for the unmanned aircraft 3. Thus, when causing the unmanned aircraft 3 to operate in accordance with an operation command, it is possible to reliably prevent interference between the unmanned aircraft 3 and the industrial machine 4.

Further, the flight path specification device 2 further includes the model acquisition unit 201 that acquires the model data from the industrial machine 4. Thus, an operator is not required to create model data indicating the three-dimensional model of the structure of the industrial machine 4, and the workload of the operator can thus be reduced.

Further, the flight path specification device 2 further includes the path information output unit 208 that outputs the flight path information to the unmanned aircraft 3. Thus, the operator is not required to perform an operation of inputting flight path information generated by the flight path specification device 2 to the unmanned aircraft 3 via a storage medium or the like. As a result, the workload of the operator can be reduced.

Further, the flight path specification device 2 includes the control information generation unit 209 that generates control information on the industrial machine 4. Thus, when no flight path FP can be specified in the non-interference space, the structure of the industrial machine 4 can be moved, and generation of flight path information can be performed again.

Further, the control information generated by the control information generation unit 209 includes control information used for prohibiting the operation of the industrial machine 4. Thus, there is no risk of the industrial machine 4 being moved while the unmanned aircraft 3 is flying in accordance with the flight path information, and interference between the unmanned aircraft 3 and the industrial machine 4 can be reliably prevented.

Further, the control information generated by the control information generation unit 209 includes control information used for prohibiting motion of the structure. Thus, there is no risk of the structure of the industrial machine 4 moving while the unmanned aircraft 3 is flying in accordance with the flight path information, and interference between the unmanned aircraft 3 and the industrial machine 4 can be reliably prevented.

Note that, although the flight path specification device 2 is implemented in a PC, a server, or the like in the embodiment described above, the flight path specification device 2 may be implemented in the numerical controller 5 of the industrial machine 4.

Further, although a machine tool is illustrated as an example of the industrial machine 4 in the embodiment described above, the industrial machine 4 may be an industrial robot such as a manipulator.

Further, in the embodiment described above, the space information generation unit 204 generates non-interference space information indicating a non-interference space based on model data on structures of the industrial machine 4, model data on the unmanned aircraft 3, and the operating state of the industrial machine 4. When the unmanned aircraft 3 is relatively small and the interference space is set relatively large, however, the space information generation unit 204 may generate non-interference space information indicating a non-interference space based on model data on structures of the industrial machine 4 and the operating state of the industrial machine 4.

Further, the operating state acquisition unit 203 may acquire a machining program from the numerical controller 5. In such a case, the space information generation unit 204 may analyze the motion of a structure of the industrial machine 4, a scattering condition of the cutting fluid, or the like to generate non-interference space information on the industrial machine 4 which is in operation. This enables the unmanned aircraft 3 to perform a predetermined operation without causing collision between the unmanned aircraft 3 and the industrial machine 4 even when the industrial machine 4 is in operation.

EXPLANATIONS OF LETTERS OR NUMERALS 1 unmanned aircraft control system
2 flight path specification device
20 CPU
21 bus
22 ROM
23 RAM
24 nonvolatile memory
25 first interface
26 display device
27 second interface
28 input device
29 communication device
201 model acquisition unit
202 model data storage unit
203 operating state acquisition unit
204 space information generation unit
205 command accepting unit
206 command information storage unit
207 path information generation unit
208 path information output unit
209 control information generation unit
210 control information output unit
3 unmanned aircraft
30 battery
31 processor
32 bus
33 memory
34 motor control circuit
35 motor

13

36 sensor
37 communication device
301 communication unit
302 flight position specification unit
303 flight control unit
4 industrial machine
401 open/close door
402 turret
403 spindle
404 tool
405 table
406 splash guard
407 telescopic cover
408 workpiece
409 jig
5 numerical controller
50 CPU
51 bus
52 ROM
53 RAM
54 nonvolatile memory
55 interface
56 axis control circuit
57 PLC
58 I/O unit
510 communication unit
511 storage unit
512 control unit
6 communication device
7 servo amplifier
8 servo motor
9 auxiliary device
FP flight path

The invention claimed is:

1. A flight path specification device, comprising:
a processor configured to:
based on model data on a structure of an industrial machine and an operating state of the industrial machine, generate non-interference space information indicating a non-interference space in which the industrial machine and an unmanned aircraft do not interfere with each other, wherein the non-interference space information changes according to the operating state of the industrial machine,
accept an operation command for the unmanned aircraft,
based on the non-interference space information and the operation command, generate flight path information that specifies a flight path for the unmanned aircraft,
control the unmanned aircraft to fly along the flight path specified by the flight path information, and
generate control information used for controlling the industrial machine, wherein the control information includes
first control information used for prohibiting operation of the industrial machine,
second control information used for prohibiting motion of the structure, and
third control information used for moving the structure.

2. The flight path specification device according to claim 1, wherein the processor is further configured to acquire the model data from the industrial machine.

3. The flight path specification device according to claim 1, wherein
the processor is configured to, while the unmanned aircraft is flying along the flight path, implement control for prohibiting the operation of the industrial machine and the motion of the structure.

4. The flight path specification device according to claim 3, wherein
the operation of the industrial machine and the motion of the structure are different from each other.

5. The flight path specification device according to claim 4, wherein
the structure of the industrial machine includes a spindle, a spindle head, a table, a splash guard, an open/close door, a cover, a tool, a workpiece, and a jig.

6. A non-transitory computer readable storage medium storing an instruction for causing a computer to perform:
based on model data on a structure of an industrial machine and an operating state of the industrial machine, generating non-interference space information indicating a non-interference space in which the industrial machine and an unmanned aircraft do not interfere with each other, wherein the non-interference space information changes according to the operating state of the industrial machine;
accepting an operation command for the unmanned aircraft;
based on the non-interference space information and the operation command, generating flight path information that specifies a flight path of the unmanned aircraft;
controlling the unmanned aircraft to fly along the flight path specified by the flight path information; and
generating control information used for controlling the industrial machine, wherein
the control information includes
first control information used for prohibiting operation of the industrial machine,
second control information used for prohibiting motion of the structure, and
third control information used for moving the structure.

7. The non-transitory computer readable storage medium according to claim 6, wherein
the computer is caused to, while the unmanned aircraft is flying along the flight path, perform controlling for prohibiting the operation of the industrial machine and the motion of the structure.

8. The non-transitory computer readable storage medium according to claim 7, wherein
the operation of the industrial machine and the motion of the structure are different from each other.

9. The flight path specification device according to claim 8, wherein
the structure of the industrial machine includes a spindle, a spindle head, a table, a splash guard, an open/close door, a cover, a tool, a workpiece, and a jig.

* * * * *